July 5, 1955 — O. W. BOUGHTON — 2,712,267
STAGE FOCUSING MECHANISM FOR BENCH PROJECTOR
Filed April 19, 1954 — 2 Sheets-Sheet 2
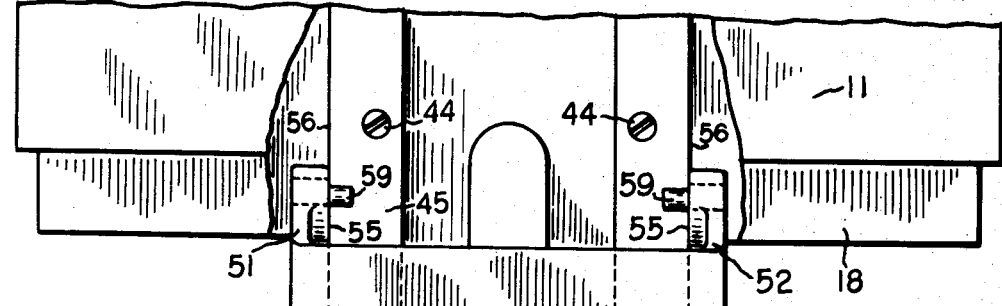
Fig. 2
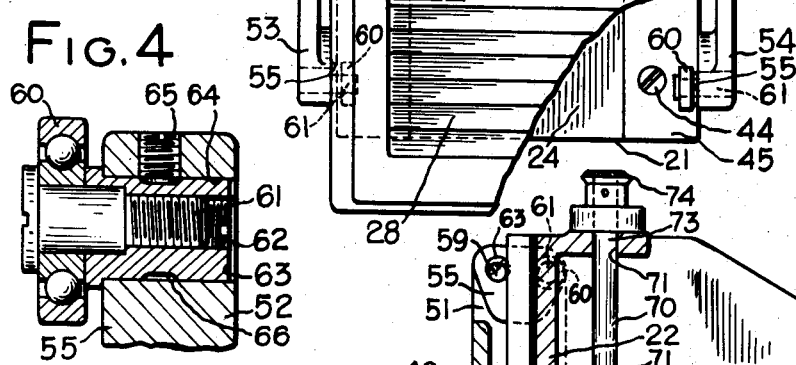
Fig. 4
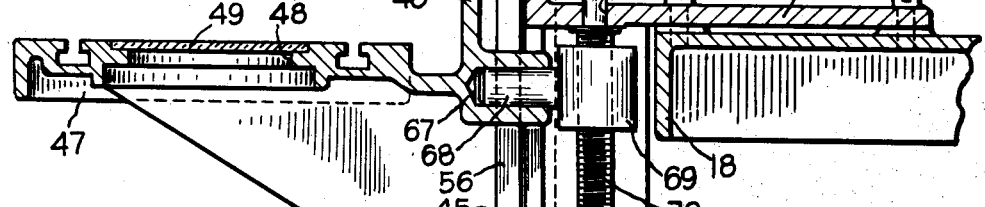
Fig. 3
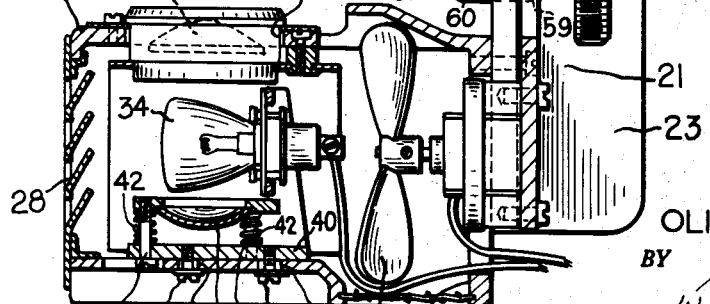
INVENTOR.
OLIN W. BOUGHTON
BY
*J. A. Ellestad*
*W. E. Recktenwald*
ATTORNEYS › # United States Patent Office 2,712,267
Patented July 5, 1955

2,712,267
STAGE FOCUSING MECHANISM FOR BENCH PROJECTOR

Olin W. Boughton, Canandaigua, N. Y., assignor to Bausch & Lomb Optical Company, Rochester, N. Y., a corporation of New York Application April 19, 1954, Serial No. 424,121

3 Claims. (Cl. 88—24)

This invention relates to optical measuring instruments and more particularly to contour measuring projectors.

One of the objects of this invention is to provide a contour measuring projector which is constructed and arranged to be supported on a table in a readily accessible and usable position.

Another object of this invention is to provide a contour measuring projector having a novel object stage mounting.

A further object of this invention is to provide an improved contour measuring projector which is comparatively simple and rugged in structure, and efficient and accurate in operation.

These and other objects and advantages reside in certain novel features of construction, arrangement and combination of parts as will hereinafter be more fully described and pointed out in the appended claims.

Referring to the drawings:

Fig. 2 is a fragmentary front elevation of the lower part thereof with portions broken away.

Fig. 3 is a fragmentary vertical section of the lower part shown in Fig. 2.

Fig. 4 is a fragmentary vertical section showing the mounting of one of the rollers.

Figure 1:
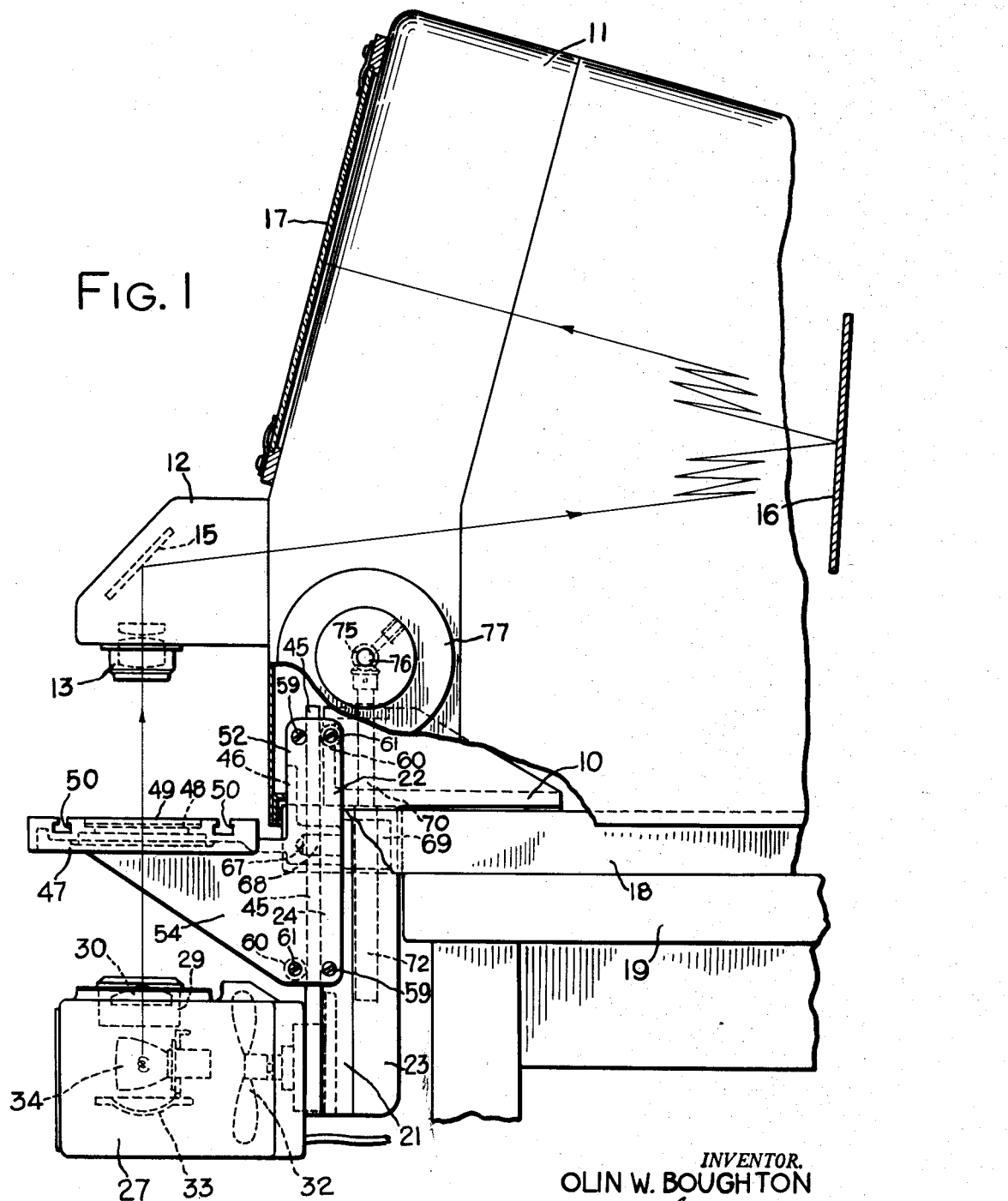
Fig. 1 is a side elevation of a contour measuring projector embodying my invention, portions being broken away to show the interior parts of the apparatus.

Referring to the drawing in detail, the projection apparatus of the present invention consists of a base 10 upon which is mounted a casing 11 having a forwardly projecting part 12 for supporting a vertically positioned objective lens 13. Fastened within the casing 11 and part 12 are the mirrors 15 and 16 for directing an image formed by said objective lens 13 onto a ground glass image screen 17 mounted at an angle to the vertical on the upper fore portion of the casing 11. A sub-base 18 is fastened to the under portion of the base 10 and is adapted to rest upon a bench 19 for supporting the projection apparatus at a convenient and readily usable height.

A bracket 21, depending from the front portion 22 of the base 10, has a pair of rearwardly projecting side walls 23 and a front wall 24. Fastened to the lower portion of the front wall 24 of said bracket 21, below the plane of the bottom of the base 10, is a housing 27 which has a louvered front portion 28 and an opening 29 in the top portion in which is mounted a condenser lens 30 in optical alignment with the objective lens 13. Mounted within the housing 27 is a fan 32 which is adapted to provide ventilation for a reflector 33, a light source 34 and the condenser lens 30 by pulling air through the screened opening 35, across said reflector, light source and lens, and discharging same through the louvered front 28. Adjustably mounted within the housing 27 by means of screws 38 passing through enlarged openings 39 is an upstanding U-shaped bracket 40 which supports the light source 34 in optical alignment with the condenser lens 30 and the objective lens 13. The reflector 33 is resiliently mounted on said bracket 40 by means of screws 41 and springs 42 so that a sudden shock to the system will be absorbed by the springs 42 instead of by the reflector. The light source 34, lying in a plane below the plane of the bottom of the base 10, has the condenser lens 30 disposed in overlying relation thereto in another plane that is also below the plane of the bottom of the base 10. With the base 10 of the projection apparatus resting on the bench 19, the image screen 17, which is inclined at an angle to the vertical, is positioned at the proper height for easy viewing by an operator sitting on a standard laboratory stool in front of the apparatus.

Fastened by means of screws 44 to the front wall 24 of the bracket 21 is a pair of horizontally spaced vertically positioned parallel guide tracks 45 which extend from overlying relationship with the lower portion of the base 10 downwardly on opposite sides of the rear part of the housing 27. The outer edge portions of the tracks 45 project outwardly from the plane of the side walls 23 of the bracket 21 so as to expose a front and rear face of said track 45 for a purpose to be described later.

A vertically positioned H-shaped support member 46, mounted for vertical movement on the guide tracks 45, has a horizontally positioned object stage 47 fastened at a right angle thereto midway of the height thereof. Said object stage 47 projects outwardly from the support member 46 and is movable vertically with the support member 46 between the objective lens 13 and the condenser lens 30. The central portion of the object stage 47 has an opening 48 therethrough adapted to receive a transparent, i. e., glass, object supporting plate 49 which is in optical alignment with the objective lens 13 and condenser lens 30.

By having the light source 34 mounted in a plane below the base 10, the height of the image screen 17 can be kept at eye level while the object stage 47 with its attendant adjustments are readily observable and within easy reach of the operator.

The support member 46 has four arms 51, 52, 53 and 54, one pair of arms 51 and 52, called the upper arms, projecting upwardly and the other pair of arms 53 and 54, called the lower arms, projecting downwardly, respectively, from said object stage 47 so as to lie in operative position relative to said spaced tracks 45. An outer portion of each arm 51, 52, 53, 54 has a substantially flat surface area 55 which faces inwardly toward the similar flat area 55 of the other arm of the pair. Each flat surface area 55 partially overlies the outer edge portion 56 of each of the tracks 45 so that the arms 51, 52 and 53, 54 are spaced apart a distance slightly greater than the distance between the outer edge portions 56 of the tracks 45. The flat surface area 55 of each arm carries a mounting means which comprises a horizontally adjustable guide pin 59 horizontally spaced from a roller 60 which is freely rotatable on a horizontally adjustable shaft 61. Each shaft 61 and pin 59 is threaded into an eccentrically positioned bore 62 formed in a bushing 63 which is mounted in bore 64 formed in each arm. The bushing 63 is retained in the bore 64 by the engagement of set screw 65 in the groove 66. Projecting from the flat surface 55 of each upper arm 51, 52 is the pin 59 mounted on the stage side of the shaft 61 and roller 60, said pin 59 and roller 60 engaging the front and rear faces, respectively, of the track 45. Conversely, projecting from the flat surface 55 of each lower arm 53, 54 is the shaft 61 and roller 60 mounted on the stage side of the pin 59, said roller 60 and pin 59 engaging the front and rear faces, respectively, of the track 45. It will be apparent that the weight of the stage will pull the upper rollers 60 into contact with the rear faces of the tracks 45 and will push the lower rollers 60 into contact with the front faces of said tracks 45 to provide smooth rolling contact therewith when the stage 47 is moved up and down relative to the base 10. The pins 59 will act as guides for holding the stage 47 steady and in adjusted position.

The bushing 63, shown in Fig. 4, is eccentrically bored at 62 so that when said bushing 63 is turned about its axis relative to the arm (51, 52, 53, 54), the axis of the pin 59 and shaft 61 describes a circle about the axis of the bushing 63. The rotation of the bushing 63 therefore shifts either the roller 60 or the pin 59, as the case may be, horizontally an amount equal to the diameter of said circle described by the axis of the pin 59 or shaft 61 about the axis of the bushing 63. The rollers 60 and pins 59 are shifted horizontally to adjust the object stage 47 into substantially level horizontal relationship. The adjustment also provides a means for taking up slack or play between each roller 60, pin 59 and track 45 caused by wear between the parts. The rollers 60 and pins 59 will bear snugly against the respective faces of the track 45.

As best shown in Figs. 1 and 3, the support member 46 has a socket portion 67 into which is fitted a male member 68 projecting from the threaded nut 69. A screw member 70 is rotatably mounted in apertures 71 in the base 10 with one end portion 72 in threaded engagement with the threaded nut 69 and the other end portion 73 carrying a bevel gear 74 in engagement with a bevel gear 75 mounted on a horizontal drive shaft 76. The drive shaft 76 is rotated by a hand wheel or knob 77 fastened on the projecting end thereof. Rotation of the knob 77 rotates the screw 70 for raising and lowering the object stage 47 relative to the condenser lens 30 and objective lens 13 for focusing an object carried on said object stage so that an image of the object is projected by the objective lens 13 onto the mirrors 15 and 16 in the casing 11 and thence upon the image screen 17 for viewing by an operator.

Due to the separated relationship of the downwardly projecting arms 53, 54 and due to the particular type of roller and track mounting means, it is possible to lower the object stage 47 substantially into contact with the condenser lens 30 when focusing an object under examination on the glass supporting plate 49. This increased range of focus is accomplished without affecting the stability or rigidity of the object stage 47. Since the weight of the object under examination and the weight of the object stage 47 create a downwardly directed force, it will tend to pull the upper arms 51, 52 forward and push the lower arms 53, 54 rearward. The arms 51, 52 and 53, 54 are spaced above and below the object stage 47, respectively, an amount sufficient to most effectively support this weight without undue twisting of the support member. No matter how heavy the piece supported on the object stage 47, the rolling type mounting will not bind or stick, but on the contrary will always provide smooth motion up and down the tracks 45.

In operation, the object whose contour is to be examined is placed on the plate 49 and the contour of the section of its surface under examination is focused on the image screen by vertical adjustment of the object stage. This last-named adjustment is accomplished by turning the knob 77 clockwise or counterclockwise which causes rotation of screw 70 and thereby vertically adjusts the stage 47. Once the object is in sharp focus, the contour under examination can be compared with a master or measurements may be taken thereof.

From the foregoing, it will be apparent that I am able to attain the objects of my invention and provide a new and improved contour measuring projector which is rugged and simple in structure, and efficient and accurate in operation. My measuring projector is constructed and arranged to be positioned on a table or bench with the light source supported below the plane of the table in such a way that an operator sitting on an ordinary laboratory stool is comfortably positioned in front of the instrument for convenient operation thereof. My invention further provides a measuring projector with a novel object stage mounting having a greater range of focus without sacrificing any of the stability of the stage. Various modifications can, of course, be made without departing from the spirit of my invention or the scope of the appended claims.

I claim:

1. A contour measuring projector for measuring objects comprising a base, a downwardly directed objective lens carried by a forwardly projecting portion of said base, an angularly disposed image screen mounted on said base above said objective lens, mirror means mounted on said base in optical alignment with said screen and said objective lens, a bracket depending from the front portion of said base, a housing fastened at one end on the lower portion of said bracket below the plane of the bottom of the base, a light source mounted within the housing, a condenser lens carried by the housing in optical alignment with the light source and the objective lens, horizontally spaced vertically positioned parallel guide tracks carried by said bracket and extending downwardly on opposite sides of the housing, a horizontally positioned vertically movable object stage, a transparent portion through said stage in optical alignment with the condenser lens and the objective lens, a pair of upwardly and a pair of downwardly projecting arms extending from the object stage, each pair of arms being spaced apart a distance slightly greater than the distance between the outer edge portions of the tracks, a pin and a roller horizontally spaced from each other on the outer portion of each arm, said upper arms having said pins mounted on the stage side of the rollers so that said rollers will engage the rear faces of the tracks, said lower arms having the rollers mounted on the stage side of the pins so that said last-named rollers will engage the front faces of the tracks whereby said rollers will roll smoothly on said tracks, a threaded nut rearwardly projecting from the object stage, a screw member engaging with said nut, and drive means projecting from said base for rotating said screw member for raising and lowering the object stage to focus an object on said stage onto the screen.

2. In a contour measuring projector the combination of a base, a downwardly directed objective lens carried by a forwardly projecting portion of said base, an angularly disposed image screen mounted on said base above said objective lens, mirror means carried by said base in optical alignment with the condenser lens and the screen, a bracket depending from the front portion of said base, a housing fastened at one end on the lower portion of said bracket below the plane of the bottom of the base, a light source mounted within the housing, a condenser lens carried by the housing in optical alignment with the light source and the condenser lens, horizontally spaced vertically positioned parallel guide tracks carried by said bracket and extending from the base to the opposite sides of the housing, a support member movably mounted relative to said bracket, a horizontally positioned object stage mounted on said support member, a transparent plate carried by said stage in optical alignment with the condenser lens and objective lens, upper and lower arms on said support member projecting above and below said stage, respectively, the lower arms of said support member being horizontally spaced apart so that parts of said housing fit between said lower arms when the support member and object stage are in substantially lowered position, mounting means carried by said upper and lower arms, said mounting means comprising a horizontally spaced pin and shaft projecting from each arm, a roller mounted on each shaft on the upper arms for engagement with the rear faces of the tracks, rollers mounted on the shafts on the lower arms for engagement with the front faces of the tracks to provide each corner of the support member with a rolling mount, means for shifting said rollers transversely of the plane of the support member for effecting horizontal adjustment of the object stage, and a drive shaft operatively connected to said support member for raising and lowering said object stage relative to the condenser lens for focusing an image of an object on the object stage onto the screen.

3. A contour measuring projector comprising a base, a vertically positioned objective lens carried by the base, an image screen, mirror means on said base in optical alignment with said objective lens and said screen, a bracket depending from the front portion of said base, a light source fastened on said bracket and lying in a plane below the bottom of said base, a condenser lens carried by said bracket in a plane below the bottom of said base in overlying relation to said light source and in optical alignment with said light source and objective lens, a pair of horizontally spaced vertically positioned tracks carried by said bracket and extending from the lower portion of the base downwardly on opposite sides of said light source, a vertically positioned H-shaped support member movably mounted on the guide tracks, a horizontally positioned object stage fastened at a right angle on said support member and projecting outwardly from the support member, a transparent plate on said stage in optical alignment with the objective lens and condenser lens, a pair of upper arms and a pair of lower arms carried by said support member and extending, respectively, above and below said object stage adjacent to said tracks, a guide pin and a roller horizontally spaced on the outer portion of each arm in rolling contact with the front and rear faces of said tracks to permit relatively free vertical movement of the object stage, and actuating means on said base operatively connected to said support member whereby rotation of said actuating means raises and lowers said object stage for focusing an object on the stage for projection onto the screen.

References Cited in the file of this patent

UNITED STATES PATENTS

| | | |
|---|---|---|
| 2,214,376 | Kurtz | Sept. 10, 1940 |
| 2,321,697 | Moulin | June 15, 1943 |
| 2,529,507 | Ludwig | Nov. 14, 1950 |